US010681665B2

(12) United States Patent
Singh et al.

(10) Patent No.: US 10,681,665 B2
(45) Date of Patent: Jun. 9, 2020

(54) MANAGING CELLULAR SERVICE ACCESS FOR MULTIPLE SECONDARY WIRELESS DEVICES ASSOCIATED WITH A PRIMARY WIRELESS DEVICE

(71) Applicant: Apple Inc., Cupertino, CA (US)

(72) Inventors: Ajoy K. Singh, Milpitas, CA (US); Rohan C. Malthankar, San Jose, CA (US); Arun G. Mathias, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 15/995,636

(22) Filed: Jun. 1, 2018

(65) Prior Publication Data

US 2018/0352530 A1 Dec. 6, 2018

Related U.S. Application Data

(60) Provisional application No. 62/514,659, filed on Jun. 2, 2017.

(51) Int. Cl.
*H04W 72/04* (2009.01)
*H04W 60/04* (2009.01)
(Continued)

(52) U.S. Cl.
CPC .......... *H04W 60/04* (2013.01); *H04W 48/16* (2013.01); *H04W 60/06* (2013.01); *H04W 76/10* (2018.02);
(Continued)

(58) Field of Classification Search
CPC ..... H04W 60/04; H04W 60/06; H04W 76/30; H04W 76/38; H04W 76/10; H04W 76/23;
(Continued)

(56) References Cited

U.S. PATENT DOCUMENTS

2011/0085447 A1\* 4/2011 Kholaif ................ H04W 12/04
370/242
2015/0201035 A1\* 7/2015 Profit .................. H04L 67/2842
709/213

(Continued)

FOREIGN PATENT DOCUMENTS

CN 105873143 A \* 8/2016
WO WO-2016076577 A1 \* 5/2016 ............ H04W 60/06

*Primary Examiner* — Hassan Kizou
*Assistant Examiner* — Mahbubul Bar Chowdhury
(74) *Attorney, Agent, or Firm* — Dickinson Wright RLLP (57) ABSTRACT

Methods and apparatus to enable and disable cellular services for one or more cellular capable secondary wireless devices associated with a primary wireless device are disclosed. The primary wireless device, in response to detecting a status change of an in use state of a cellular capable secondary wireless device can provide a notification to a network server of a wireless network to disable cellular wireless services for previously enabled cellular capable secondary wireless devices and to enable cellular wireless services for the cellular capable secondary wireless device. Control of cellular wireless services for cellular capable secondary wireless devices can be based on a combination of registration for services, activation and deactivation of eSIMs on the cellular capable secondary wireless devices, and/or changes to eSIM states or contexts maintained by the network server.

20 Claims, 8 Drawing Sheets

(51) Int. Cl.

| | |
|---|---|
| *H04W 60/06* | (2009.01) |
| *H04W 76/30* | (2018.01) |
| *H04W 88/04* | (2009.01) |
| *H04W 76/10* | (2018.01) |
| *H04W 76/23* | (2018.01) |
| *H04W 48/16* | (2009.01) |
| *H04W 76/14* | (2018.01) |
| *H04W 8/18* | (2009.01) |
| *H04W 76/38* | (2018.01) |

(52) U.S. Cl.
CPC ........... *H04W 76/14* (2018.02); *H04W 76/23* (2018.02); *H04W 76/30* (2018.02); *H04W 88/04* (2013.01); *H04W 8/183* (2013.01); *H04W 76/38* (2018.02)

(58) Field of Classification Search
CPC ..... H04W 76/14; H04W 88/04; H04W 8/183; H04W 48/16
See application file for complete search history.

(56) References Cited

U.S. PATENT DOCUMENTS

| | | | |
|---|---|---|---|
| 2016/0154952 A1* | 6/2016 | Venkatraman | H04L 63/0861 |
| | | | 705/44 |
| 2016/0366720 A1* | 12/2016 | Wu | H04W 28/0236 |
| 2017/0272902 A1* | 9/2017 | Safonov | G01P 13/00 |
| 2017/0289998 A1* | 10/2017 | Chen | H04W 52/0235 |
| 2018/0234900 A1* | 8/2018 | Sankaranarayan | H04W 76/30 |
| 2019/0159018 A1* | 5/2019 | Basu Mallick | H04W 24/08 |

* cited by examiner

MANAGING CELLULAR SERVICE ACCESS FOR MULTIPLE SECONDARY WIRELESS DEVICES ASSOCIATED WITH A PRIMARY WIRELESS DEVICE

CROSS-REFERENCE TO RELATED APPLICATIONS

The present application claims the benefit of U.S. Provisional Application No. 62/514,659, entitled "MANAGING CELLULAR SERVICE ACCESS FOR MULTIPLE SECONDARY WIRELESS DEVICES ASSOCIATED WITH A PRIMARY WIRELESS DEVICE," filed Jun. 2, 2017, the content of which is incorporated herein by reference in its entirety for all purposes.

FIELD

The described embodiments relate generally to wireless communications using electronic devices, including systems and techniques for managing direct access to cellular services for multiple secondary wireless devices associated with a primary wireless device.

BACKGROUND

Technological advances have led to situations where a user can have multiple different wireless devices available for communication. In addition to a designated primary wireless device, such as a smart phone, a user may also have an additional secondary wireless device, such as one or more wearable computing devices that are also capable of conducting wireless communications using one or more different radio access technologies (RATs). The wireless devices, both primary and secondary, can be associated with a common user account, and the user of the wireless devices can originate outgoing communication sessions or receive incoming communication sessions using one or more of the wireless devices alone or in tandem. For a direct connection, a communication session can be anchored directly from a primary wireless device or from a secondary wireless device through a wireless network to a remote device. For a relayed connection, a communication session can be anchored at a primary wireless device, which provides a connection to a cellular wireless network, and relayed through a local wireless connection to a secondary wireless device through which the user can communicate. As multiple secondary wireless devices can be associated with a primary wireless device, multiple simultaneous direct connections to a cellular wireless network can occur, which can affect network resource utilization.

In view of the foregoing, there is a need to manage registration of secondary wireless devices to limit simultaneous direct connectivity and to switch seamlessly and efficiently between different secondary wireless devices to provide an improved user experience.

SUMMARY

Representative embodiments set forth herein disclose various systems and techniques for managing wireless devices to enable or disable communication session capabilities to allow for originating or terminating direct connections at one or more secondary wireless devices or to restrict communication for one or more secondary wireless devices to use relayed connections via a primary wireless device. In particular, the embodiments set forth various systems and techniques for a wireless connection manager executing on a primary wireless device to manage a set of associated secondary wireless devices for cellular services based on which secondary wireless device of the set of associated secondary wireless devices is in use. The wireless connection manager(s) can be triggered to carry out wireless connection management operations in an automated manner (e.g., according to default, programmed, and/or user settings) or in a reactive manner (e.g., in response to receiving a user input). According to some embodiments, a wireless connection manager can operate by (1) scanning for cellular capable secondary wireless devices associated with the primary wireless device, (2) detecting a change in which cellular capable secondary wireless device is in use, (3) notifying a network server to disable access to cellular wireless services, such as by de-registering, any previously registered cellular capable secondary wireless devices, and (4) notifying the network server to enable access to cellular wireless services, such as by registering, a particular cellular capable secondary wireless device that is in use.

This Summary is provided merely for purposes of summarizing some example embodiments so as to provide a basic understanding of some aspects of the subject matter described herein. Accordingly, it will be appreciated that the above-described features are merely examples and should not be construed to narrow the scope or spirit of the subject matter described herein in any way. Other features, aspects, and advantages of the subject matter described will become apparent from the following Detailed Description, Figures, and Claims.

Other aspects and advantages of the embodiments described herein will become apparent from the following detailed description taken in conjunction with the accompanying drawings which illustrate, by way of example, the principles of the described embodiments.

BRIEF DESCRIPTION OF THE DRAWINGS

The included drawings are for illustrative purposes and serve only to provide examples of possible structures and arrangements for the disclosed systems and techniques for intelligently and efficiently managing calls and other communications between multiple associated user devices. These drawings in no way limit any changes in form and detail that may be made to the embodiments by one skilled in the art without departing from the spirit and scope of the embodiments. The embodiments will be readily understood by the following detailed description in conjunction with the accompanying drawings, wherein like reference numerals designate like structural elements.

DETAILED DESCRIPTION

Representative applications of apparatuses, systems, and methods according to the presently described embodiments are provided in this section. These examples are being provided solely to add context and aid in the understanding of the described embodiments. It will thus be apparent to one skilled in the art that the presently described embodiments can be practiced without some or all of these specific details. In other instances, well known process steps have not been described in detail in order to avoid unnecessarily obscuring the presently described embodiments. Other applications are possible, such that the following examples should not be taken as limiting.

Wireless devices often provide for a multiplicity of different wireless connections, e.g., wireless wide area network (WWAN) connections via cellular wireless networks (when the wireless device is so equipped), wireless local area network (WLAN) connections, and wireless personal area network (WPAN) connections. A primary wireless device, such as a smartphone, can be associated with a set of cellular capable secondary wireless devices, such as a wearable device, via a common user account and can share a common cellular wireless network identifier, such as a mobile directory number (MDN), with which a service account for a cellular wireless network user can subscribe for cellular wireless network services. While non-cellular capable secondary wireless devices can communicate with a cellular wireless network only via a relayed connection through the associated primary wireless device, a cellular capable secondary wireless device can communicated either via a relayed connection or via a direction connection to the cellular wireless network. Using a relayed connection, a cellular capable secondary wireless communication device that is configured with suspended, disabled, or inactivated cellular wireless communication capability (or a secondary wireless device that does not have a cellular wireless communication capability) can originate or receive connections via an associated primary wireless device that provides for a cellular wireless connection to another device, e.g., a "remote" device across a network. The relayed connection can include a local wireless connection between the primary and secondary wireless devices, while the primary wireless device can provides a remote connection to the remote device, e.g., via a circuit-switched legacy wireless connection or via a packet-switched wireless connection, such as provided by voice over Long Term Evolution (VoLTE), by Wi-Fi calling, by Facetime® (video and/or audio), or similar connections. Alternatively, when cellular wireless communication capability of the cellular capable secondary wireless communication device is resumed, enabled, or activated, connections can terminate directly at the cellular capable secondary wireless device, including when the cellular capable secondary wireless device is not within proximity of the primary wireless device. A user can choose to enable or disable cellular wireless connection capabilities for a cellular capable secondary wireless device, e.g., via a user interface on the cellular capable secondary wireless device or through a user interface of an associated primary wireless device. For a cellular capable secondary wireless device with limited battery power, using a lower power, shorter distance, non-cellular wireless capability, e.g., via a wireless personal area network (WPAN) or a wireless local area network (WLAN), can be preferred over using a higher power, longer distance, cellular wireless capability when connections via the WPAN or WLAN are available. A local connection between the cellular capable secondary wireless device and the associated primary wireless device can be (i) a WPAN connection, such as a Bluetooth (classic or Low Energy) connection, (ii) an Apple Wireless Direct Link (AWDL) connection, (iii) a direct WLAN connection between the primary and secondary wireless devices, such as through a Wi-Fi direct connection or another ad hoc WLAN connection that does not require the use of a central access point, or (iv) an indirect WLAN connection between the primary and secondary wireless devices via a central access point.

When only a single cellular capable secondary wireless device is associated with the primary wireless device, the single cellular capable secondary wireless device can enable and disable the use of cellular wireless circuitry based on proximity to the primary wireless device. When a non-cellular wireless connection between the cellular capable secondary wireless device and the primary wireless device can exist (or can be established), the cellular capable secondary wireless device can prefer to discontinue (or disable) use of the cellular wireless circuitry, e.g., to conserve limited battery resources, as communication via a local non-cellular wireless connection can be more power efficient that communication via a distant cellular wireless connection. When a non-cellular wireless connection between the cellular capable secondary wireless device and the primary wireless device cannot be established, e.g., when the cellular capable secondary wireless device is separated by a sufficient distance from the primary wireless device, the cellular capable secondary wireless device can prefer to enable use of the cellular wireless circuitry. A user, however, may have multiple cellular capable secondary wireless devices associated with the primary wireless device via the common user account, and if each cellular capable secondary wireless device can enable its own cellular wireless circuitry to establish connections with a cellular wireless network, it would be possible to establish multiple wireless connections independently, each cellular capable secondary wireless device using the same cellular wireless network identifier. A wireless service provider may prefer to limit the number of cellular capable secondary wireless devices that can establish connections at the same time, as each cellular capable secondary wireless device that registers with the cellular wireless network and/or attaches to the cellular wireless network consumes network resources, such as required for signaling, paging, data carrying capacity, etc. In some embodiments, a wireless service provider may allow only one cellular capable secondary wireless device, from a set of cellular capable secondary wireless devices associated with a primary wireless device, to register with and/or attach to a cellular wireless network at any one time. The wireless service provider may allow both the primary wireless device and one cellular capable secondary wireless device to each be registered with and/or attached to the cellular wireless network. The wireless service provider may selectively enable/disable credentials, such as an electronic Subscriber Identity Module (eSIM), for each of a set of cellular capable secondary wireless devices associated with a primary wireless device, so that no more than a maximum number (e.g., one) of the cellular capable secondary wireless devices associated with the primary wireless device can register with and/or attach to a cellular wireless network at any one time. In some embodiments, the primary wireless device communicates with a network server to indicate a particular cellular capable secondary wireless device is active, and the network server coordinates with applicable network equipment to enable registration and/or allow attachment for the particular cellular capable secondary wireless device, while deregistering and/or disallowing attachment for any other cellular capable service wireless devices associated with the primary wireless device. In some embodiments, when a cellular capable secondary wireless device attempts to attach to and/or connect via a wireless network, network elements of the wireless network can determine whether the cellular capable secondary wireless device is allowed to attach to and/or connect with the wireless network, e.g., based on whether the cellular capable secondary wireless device has been previously indicated to the wireless network as active by the primary wireless device, and allow or disallow attachment and/or connection with the wireless network. In some embodiments, a cellular capable secondary wireless device when within proximity of the primary wireless device will disable, power down, and/or place in a reduced power consumption state cellular wireless circuitry of the cellular capable secondary wireless device and use non-cellular wireless circuitry for communication with the primary wireless device. In some embodiments, when not within proximity of the primary wireless device, the cellular capable secondary wireless device will enable, power up, and/or place in a non-reduced power consumption state the cellular wireless circuitry of the cellular capable secondary wireless device and attempt to use cellular wireless circuitry for communication with a wireless network. In some embodiments, the cellular capable secondary wireless device will enable the cellular wireless circuitry only when in use, e.g., only when in an active state or when the primary wireless device has indicated to the cellular capable secondary wireless device that cellular wireless connections by the cellular capable secondary wireless device are allowed.

A user can switch between different cellular capable secondary wireless devices, such as when changing between different wearable devices, where the different cellular capable secondary wireless devices are associated with a common user account and associated with the primary wireless device. The primary wireless device can obtain from associated secondary wireless devices, including cellular capable secondary wireless devices, a status of whether the secondary wireless device is in use, e.g., whether a wearable device is in physical contact with a user. The cellular capable secondary wireless device can provide the status to the primary wireless device including, in some embodiments, a confidence level for the indicated status. In some embodiments, the status includes an indication of one or more states that provide more detailed information of whether the cellular capable secondary wireless device is in use, e.g., an "on wrist" state with an associated confidence metric, a "wrist raise motion" state, and/or an external power connection state, such as to a magnetically coupled external charger. In some embodiments, the primary wireless device can aggregate the status information for multiple cellular capable secondary wireless devices and determine a particular cellular capable secondary wireless device as having a highest likelihood of being in use. In some embodiments, the primary wireless device provides an indication to a network server of a wireless network of a particular cellular capable secondary wireless device as being active and/or in use, where the indication is provided in response to detecting a change in which of a set of cellular capable secondary wireless devices is in use. A change can include when a user switches between different cellular capable secondary wireless devices, or when a user begins to use a cellular capable secondary wireless device (e.g., changing from a state of not using one of the cellular capable secondary wireless devices). In some embodiments, the primary wireless device provides an indication to the network server of the wireless network when a user stops use of a cellular capable secondary wireless device, e.g., indicating that none of a set of cellular capable secondary wireless devices associated with the primary wireless device are active.

A wireless service provider may restrict a number of active cellular capable secondary wireless devices associated with a primary wireless device, e.g., by allowing only one (or another maximum positive integer number) cellular capable secondary wireless devices to be active at any one time. A network server can maintain for the wireless service provider information about identities of a set of cellular capable secondary wireless devices associated with the primary wireless device, e.g., including unique identifiers for each of the cellular capable secondary wireless devices and an "in use" or active/inactive state for each cellular capable secondary wireless device. In some embodiments, the primary wireless device provides indication of the state of one or more cellular capable secondary wireless devices. In some embodiments, one or more of the cellular capable secondary wireless devices provides indication of the state of their respective corresponding state to the network server of the wireless network, either directly by communicating with the network server, when possible, or indirectly by communicating with the primary wireless device, which communicates with the network server. In some embodiments, the primary wireless device provides an indication of an identity of a cellular capable secondary wireless device to the network server when the cellular capable secondary wireless device associates with, e.g., initially pairs with, the primary wireless device. In some embodiments, the primary wireless device provides an indication of a change in pairing status to the network server when the cellular capable secondary wireless device disassociates from, e.g., un-pairs with, the primary wireless device. In some embodiments, the primary wireless device provides an indication of a change in proximity status to the network server when the cellular capable secondary wireless device moves within proximity of the primary wireless device or moves out of proximity of the primary wireless device. In some embodiments, the primary wireless device scans for cellular capable secondary wireless devices and provides an indication of the cellular capable secondary wireless devices to the network server, e.g., based on information obtained from the cellular capable secondary wireless devices within proximity of the primary wireless device. In some embodiments, the network server, alone or in conjunction with other applicable network elements of the wireless network, changes a status for credentials for cellular capable secondary wireless devices associated with the primary wireless device based on information obtained from the primary wireless device and/or from the cellular capable secondary wireless devices. In some embodiments, the network server changes a state for an electronic SIM (eSIM) of a cellular capable secondary wireless device, e.g., enable an eSIM or disable an eSIM, based on one or more of: (i) whether the cellular capable secondary wireless device is within proximity of the primary wireless device, or (ii) whether the cellular capable secondary wireless device is "in use" or an active/inactive state, where information for the proximity status and/or the active/inactive state is provided to the network server by the primary wireless device and/or by the cellular capable secondary wireless device. In some embodiments, a network server only permits a maximum of one cellular capable secondary wireless device to be active at any given time for an associated primary wireless device. In some embodiments, a network server permits up to a pre-defined maximum number of cellular capable secondary wireless devices to be active at any given time for the associated primary wireless device. In some embodiments, the primary wireless device interacts with the network server to cause enablement/disablement of an eSIM for a cellular capable secondary wireless device associated with the primary wireless device. In some embodiments, the primary wireless device interacts with the network server to cause registration/de-registration of a cellular capable secondary wireless device associated with the primary wireless device. In some embodiments, the primary wireless device interacts with the network server to allow/disallow attachment (or to force a detachment) of a cellular capable secondary wireless device associated with the primary wireless device for a cellular wireless network. In some embodiments, a default state for an eSIM of a cellular capable secondary wireless device is "not enabled" or "disabled" and requires enablement of the eSIM via an associated primary wireless device in conjunction with communication with a network server. In some embodiments, a network server, responsive to a status update from a primary wireless device, causes suspension or resumption of a context or state for the eSIM of one or more cellular capable secondary wireless devices associated with the primary wireless device.

Accordingly, the foregoing approaches provide systems and techniques for intelligently and efficiently managing connections for wireless devices. A more detailed discussion of these systems and techniques is set forth below and described in conjunction with FIGS. 1 through 8, which illustrate detailed diagrams of systems and methods that can be used to implement these systems and techniques.

In accordance with various embodiments described herein, the terms "wireless communication device," "wireless device," "mobile device," "mobile station," "wireless station", "wireless access point", "station", "access point" and "user equipment" (UE) may be used herein to describe one or more common consumer electronic devices that may be capable of performing procedures associated with various embodiments of the disclosure. In accordance with various implementations, any one of these consumer electronic devices may relate to: a cellular phone or a smart phone, a tablet computer, a laptop computer, a notebook computer, a personal computer, a netbook computer, a media player device, an electronic book device, a MiFi® device, a wearable computing device, as well as any other type of electronic computing device having wireless communication capability that can include communication via one or more wireless communication protocols such as used for communication on: a wireless wide area network (WWAN), a wireless metro area network (WMAN) a wireless local area network (WLAN), a wireless personal area network (WPAN), a near field communication (NFC), a cellular wireless network, a fourth generation (4G) LTE, LTE Advanced (LTE-A), and/or a first generation (5G) or other present or future developed advanced cellular wireless networks.

The wireless device, in some embodiments, can also operate as part of a wireless communication system, which can include a set of client devices, which can also be referred to as stations, client wireless devices, or client wireless devices, interconnected to an access point (AP), e.g., as part of a WLAN, and/or to each other, e.g., as part of a WPAN and/or an "ad hoc" wireless network, such as a Wi-Fi direct connection. In some embodiments, the client device can be any wireless device that is capable of communicating via a WLAN technology, e.g., in accordance with a wireless local area network communication protocol. In some embodiments, the WLAN technology can include a Wi-Fi (or more generically a WLAN) wireless communication subsystem or radio, the Wi-Fi radio can implement an Institute of Electrical and Electronics Engineers (IEEE) 802.11 technology, such as one or more of: IEEE 802.11a; IEEE 802.11b; IEEE 802.11g; IEEE 802.11-2007; IEEE 802.11n; IEEE 802.11-2012; IEEE 802.11ac; or other present or future developed IEEE 802.11 technologies.

Figure 1:
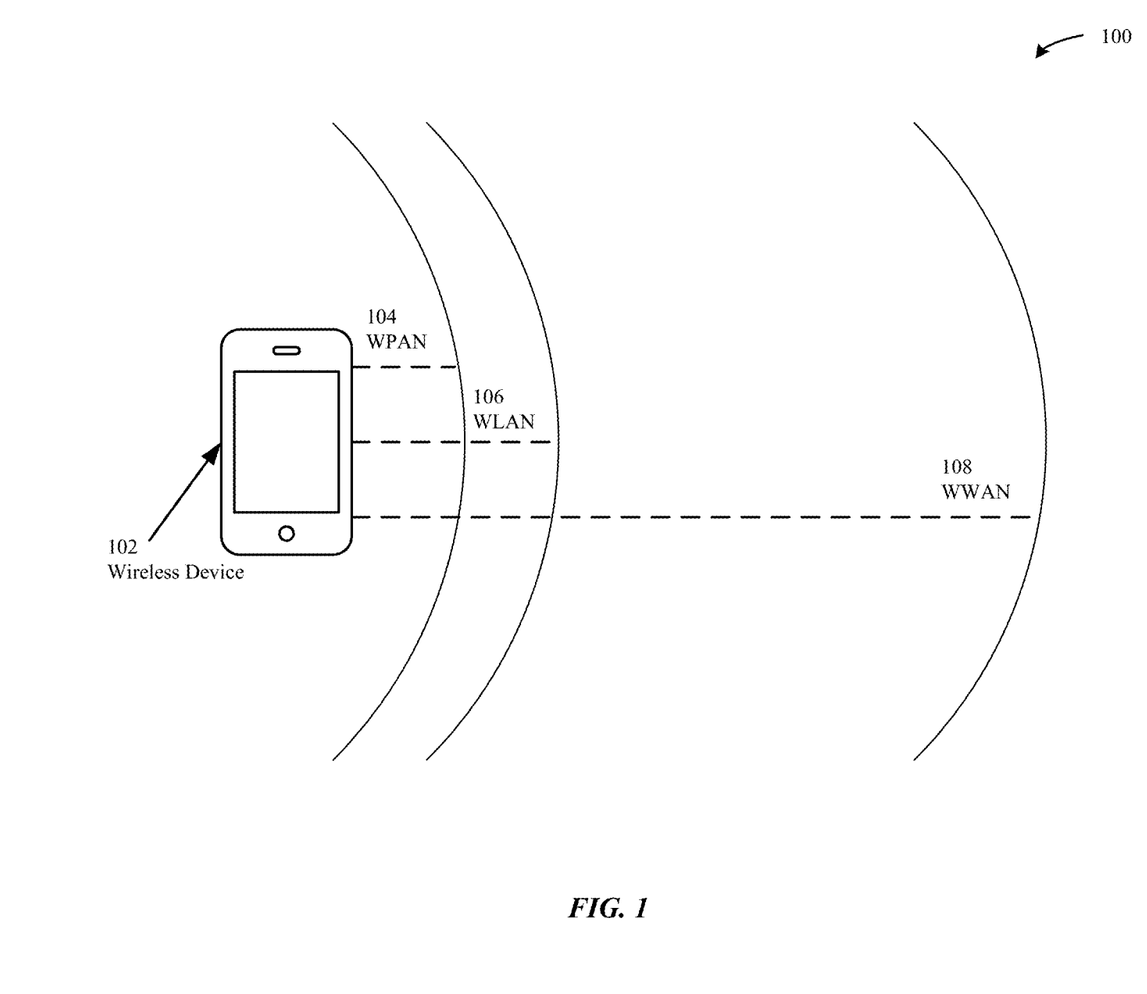
FIG. 1 illustrates in block diagram format a set of overlapping networks for an exemplary wireless device according to various embodiments of the present disclosure.

FIG. 1 illustrates a set of overlapping wireless networks for a wireless device illustrated in block diagram format. The wireless device 102 can include a combination of hardware and software to provide wireless connections using one or more different wireless networks alone, separately, or in combination, such as via the set of overlapping networks 100. The wireless device 102 can represent a device having wireless communications capabilities, such as a smart phone (e.g., an iPhone®), a tablet device (e.g., an iPad®), a wearable device (e.g., an Apple Watch™), a portable media player (e.g., an iPod®), a laptop computer (e.g., a MacBook®), or a desktop computer (e.g., an iMac®), among other possible devices. Additional wireless devices, which can connect to the wireless device 102 and provide audio, video, and/or data media interfaces can include a wireless headset, a vehicle sound system, a digital television, a digital media recorder, a wearable computing device or any other suitable wireless device capable of wireless communication and input/output capabilities.

The wireless device 102 can include a combination of hardware, software, and/or firmware to provide communication using a WPAN 104, which can provide power efficient connections while operating over a limited distance. WPAN connections can typically provide for connecting the wireless device 102 to peripheral and associated wireless devices, such as headsets, earpieces, supplemental display devices, and supplemental input/output devices, for example. WPAN connections can also be used to relay communication between the wireless device 102 and the peripheral wireless device through which the user can interact for a communication session. A representative WPAN 104 can operate in accordance with a communication protocol specified by the Bluetooth SIG, for example, and/or by Apple such as an Apple Wireless Direct Link (AWDL). The wireless device 102 can also include a combination of hardware, software, and/or firmware to provide communication using a WLAN 106 that can provide a higher data rate and a greater operating range than a WPAN 104. The wireless device 102 can include separate and/or shared hardware, software, and/or firmware elements for the WPAN 104 and the WLAN 106. Both the WPAN 104 and WLAN 106 can operate as "local" wireless networks. The wireless device 102 can also include additional hardware, software, and/or firmware to provide a WWAN 108 capability, such as to interconnect with one or more cellular wireless networks. The wireless device 102 can provide a multitude of services using one or more connections through its wireless networking capabilities. As described further herein, a primary wireless device can include WWAN 108 capability, while a cellular capable secondary wireless device can also include WWAN 108 capability in addition to providing WLAN 106 and/or WPAN 104 communication capabilities. The cellular capable secondary wireless device can communicate directly with a remote device via a WWAN 108 connection, or indirectly with a remote device via a WLAN 106 connection or a WPAN 104 connection.

Figure 2:
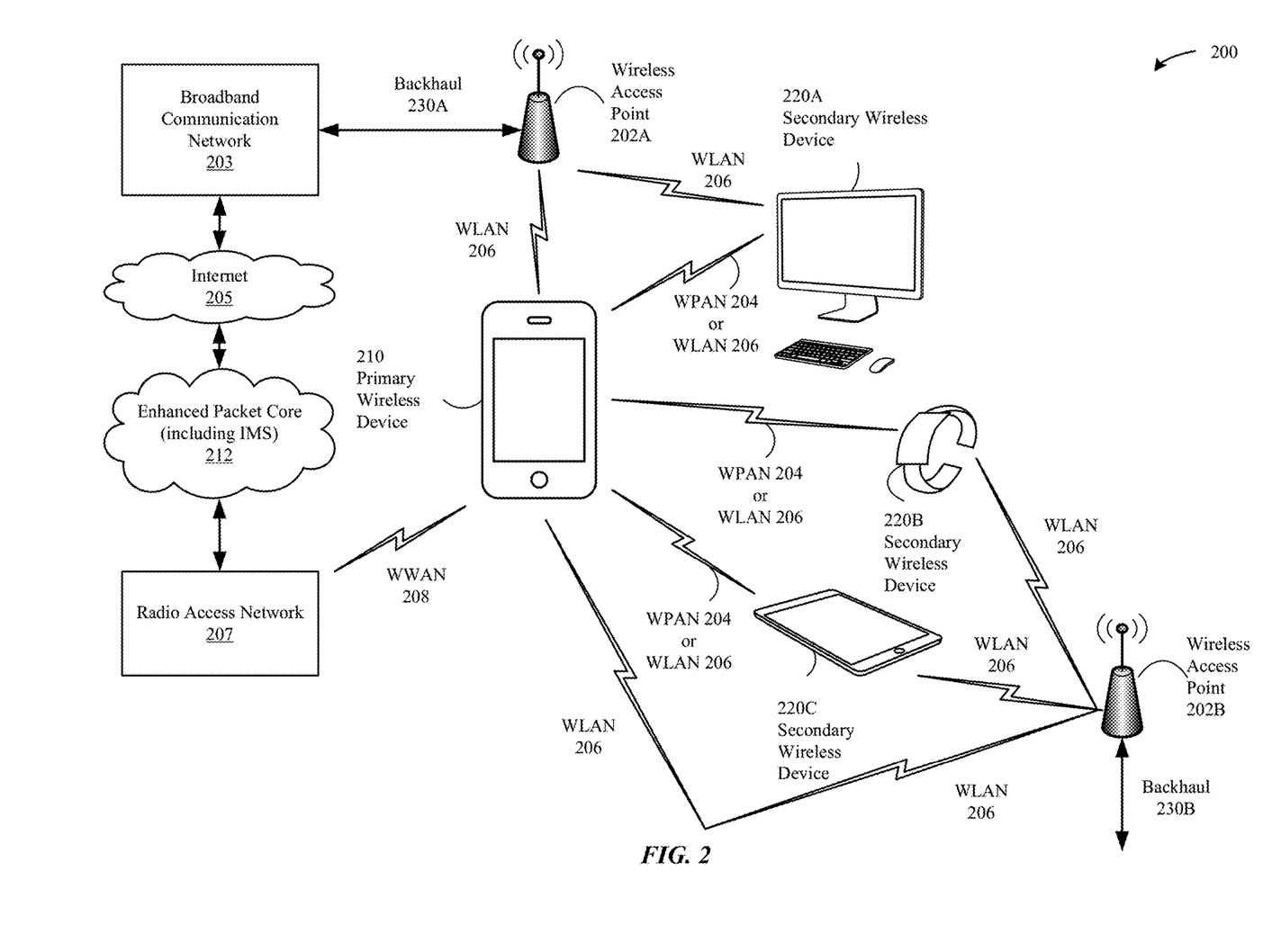
FIG. 2 illustrates in block diagram format an exemplary system of different wireless networks and wireless devices according to various embodiments of the present disclosure.

FIG. 2 illustrates, in block diagram format, an exemplary system 200 including different wireless networks and wireless devices. System 200 includes a primary wireless device 210 that can be interconnected through several different wireless communication technologies to an external set of networks and to a set of one or more secondary wireless devices 220A, 220B, and 220C, some of which may have cellular wireless communication capabilities, while others may only have non-cellular wireless communication capabilities. The primary wireless device 210 can act as a "central" device for WPAN purposes and/or can form direct WLAN connections, such as Wi-Fi direct links and/or Apple Wireless Direct Link (AWDL) connections, to one or more of the secondary wireless devices 220A/B/C. The primary wireless device 210 can also connect via a WWAN connection 208 through a radio access network 207 and an enhanced packet core network 212, which can include an Internet Protocol (IP) Multimedia Subsystem (IMS) to manage packet connections such as for Voice over LTE (VoLTE). The primary wireless device 210 can use the WWAN connection 208 to access a broad variety of services (e.g., voice calls, text messages, data access, video calls, multimedia messaging, and media streaming). Similarly, the primary wireless device 210 can use a WLAN connection 206 provided through a wireless access point 202A interconnected to a broadband communication network 203 via a backhaul connection 230A to access a similar wide range of services (or through wireless access point 202B interconnected via a backhaul connection 230B to the same (or another) broadband communication network 203. The broad set of services provided through the WWAN connection 208 and/or through the WLAN connection 206 can be extended to one or more secondary wireless devices 220A/B/C through additional WLAN connections 206 or WPAN connections 204.

Figure 3:
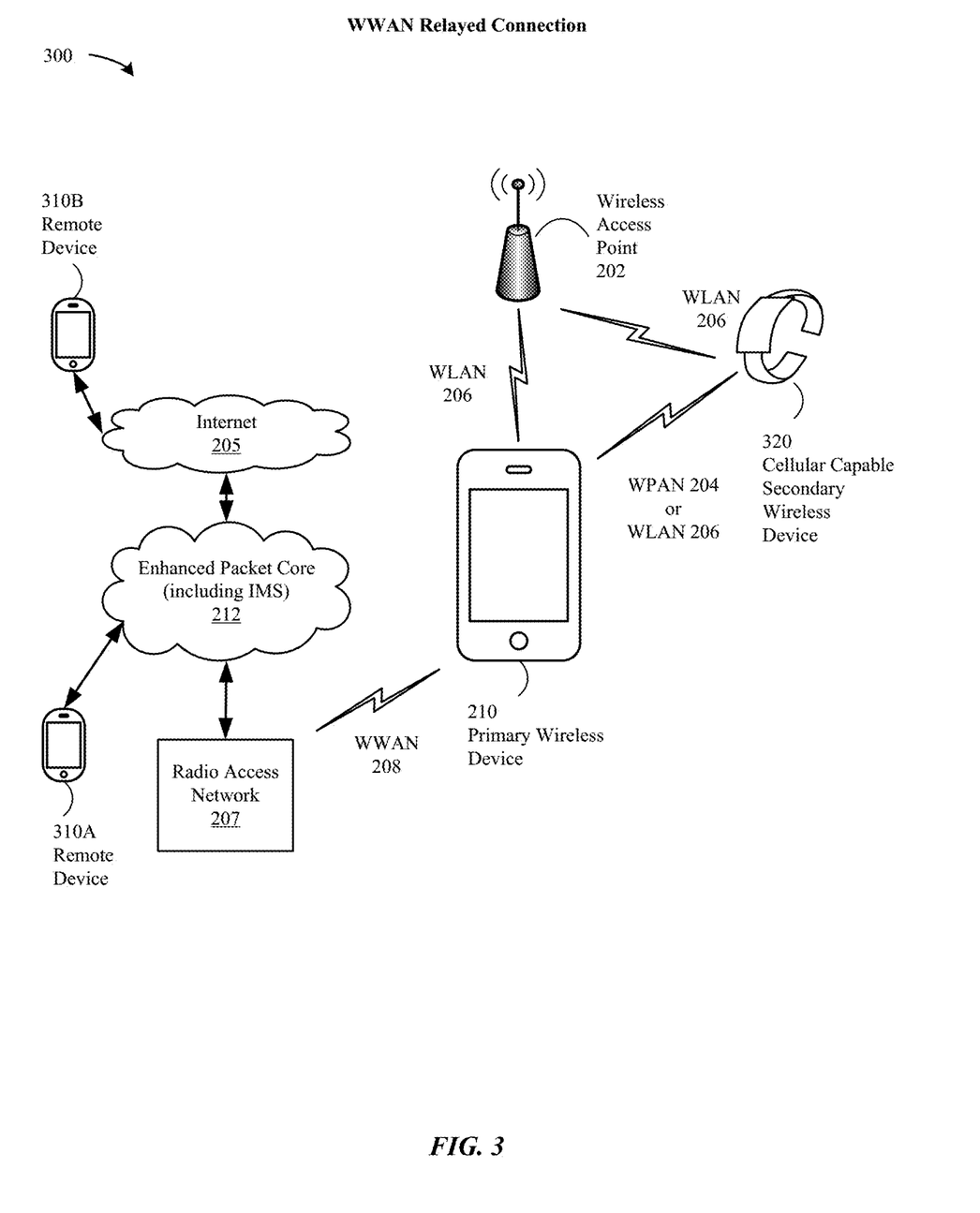
FIG. 3 illustrates in block diagram format a wireless wide area network relayed connection between a cellular capable secondary wireless device and a remote device through a primary wireless device via a non-cellular wireless network and a cellular wireless network according to various embodiments of the present disclosure.

FIG. 3 illustrates a block diagram 300 of a relayed WWAN connection 208 between a cellular capable secondary wireless device 320 and a remote device 310A or 310B through a primary wireless device 210 via a local non-cellular wireless network, e.g., via a WLAN connection 206 through wireless AP 202, via a WPAN connection 204, or via a direct WLAN connection 206 between the primary wireless device 210 and the cellular capable secondary wireless device 320. The relayed connection also includes a wireless wide area network connection 208 between the primary wireless device 210 and a cellular wireless network that includes a radio access network 207 and an enhanced packet core network 212 connected to the Internet 205. The primary wireless device 210 can serve as an anchor for a connection to the remote device 310A or 310B and relay audio, video, data, messaging, media, or other applicable communication packets to the cellular capable secondary wireless device 320. The relayed connection can use either the WLAN connection 206 (via wireless AP 202 or direct) or the WPAN connection 204 to extend the connection between the primary wireless device 210 and the remote device 310A or 310B. The WPAN connection 204 can provide limited range, while the WLAN connections 206, either through the wireless access point (AP) 202 or directly, can provide a wider range (as well as higher throughput) for local connection between the primary wireless device 210 and the cellular capable secondary wireless device 320. Communication to and from remote device 310A or 310B can traverse an enhanced packet core network 212, which can include an IMS network element, or the Internet 205. Packets for a communication session can be managed by the IMS network element and/or by a network-based server knowledgeable of associations between the primary wireless device 210 with the cellular capable secondary wireless device 320, e.g., by an iCloud server. Relayed connections via the primary wireless device 210 can be preferred to direct cellular wireless connections to the cellular capable secondary wireless device 320 when relayed connections are available, as the shorter distance for local communication between the cellular capable secondary wireless device 320 and the primary wireless device 210 can consume less battery power than longer distance direct cellular wireless connections.

Figure 4:
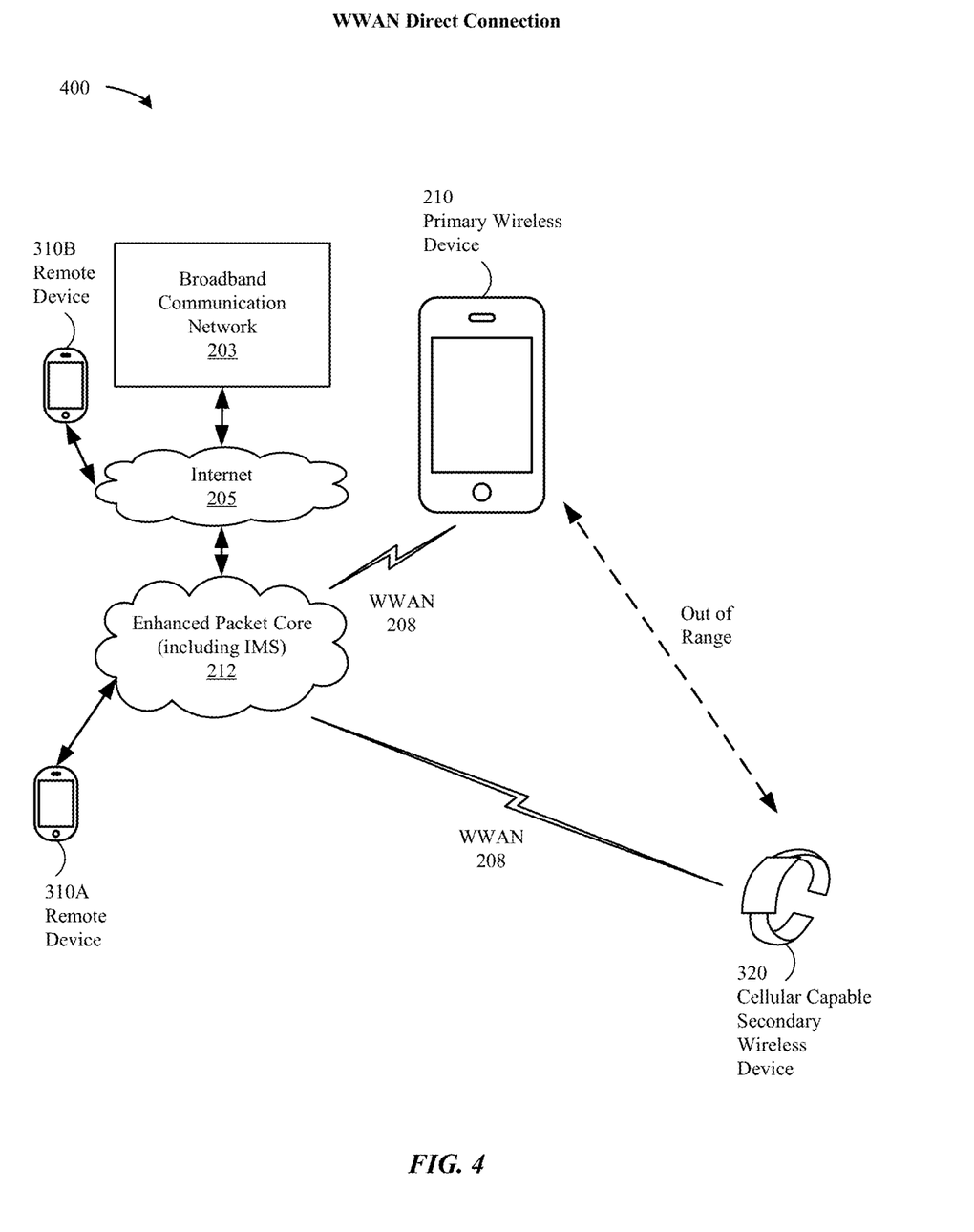
FIG. 4 illustrates in block diagram format a wireless wide area network direct connection between a cellular capable secondary wireless device and a remote device via a cellular wireless network according to various embodiments of the present disclosure.

FIG. 4 illustrates a block diagram 400 of a direct WWAN connection 208 between a cellular capable secondary wireless device 320 and a remote device 310A or 310B, where the direct WWAN connection 208 may be used when the cellular capable secondary wireless device 320 is out of range of the primary wireless device 210 and the cellular wireless network allows the cellular capable secondary wireless device 320 to camp on, attach to, and/or establish a connection with the cellular wireless network. The direct WWAN connection 208 for the cellular capable secondary wireless device 320 can provide for packet-switched voice services, such as Voice over Internet Protocol (VoIP) or Voice over Long Term Evolution (VoLTE) and for packet-switched data services to the remote device 310A or 310B. The cellular capable secondary wireless device 320 (and a user thereof) can be mobile, e.g., the user of the cellular capable secondary wireless device 320 can move and thereby change position with respect to the primary wireless device 210, which can provide relayed connections that use shorter distance local connections as illustrated in FIG. 3. When within proximity (within local wireless connectivity range) of the primary wireless device 210, the cellular capable secondary wireless device 320 can use local connections, e.g., WPAN connections 204 and/or WLAN connections 206, to the primary wireless device 210. When not within proximity (out of local wireless connectivity range) of the primary wireless device 210, the cellular capable secondary wireless device 220 may communicate via a WWAN connection 208, when permitted to establish the WWAN connection 208. In some embodiments, a maximum number (e.g., one or a predetermined limit set by a wireless service provider) of cellular capable secondary wireless devices 320 associated with the primary wireless device 210 can be allowed to establish WWAN connections 208 at any given time. In some embodiments, a network server, which can include an IMS registration server of the enhanced packet core network 212, can obtain status information for cellular capable secondary wireless devices 320 associated with the primary wireless device 210, e.g., via communication sent by (or retrieved from) the primary wireless device 210. The primary wireless device 210 can provide information about whether one or more of a set of cellular capable secondary wireless devices 320 is active (in use) or inactive (not in use). In some embodiments, the primary wireless device 210 provides information indicating a change in status, e.g., from active to inactive or vice versa, for a cellular capable secondary wireless device 320, and the network server changes a registration status of the cellular capable secondary wireless device 320, e.g., to allow (when active) or to disallow (when inactive) camping on, attachment to, or establishment of connections with the cellular wireless network.

Figure 5:
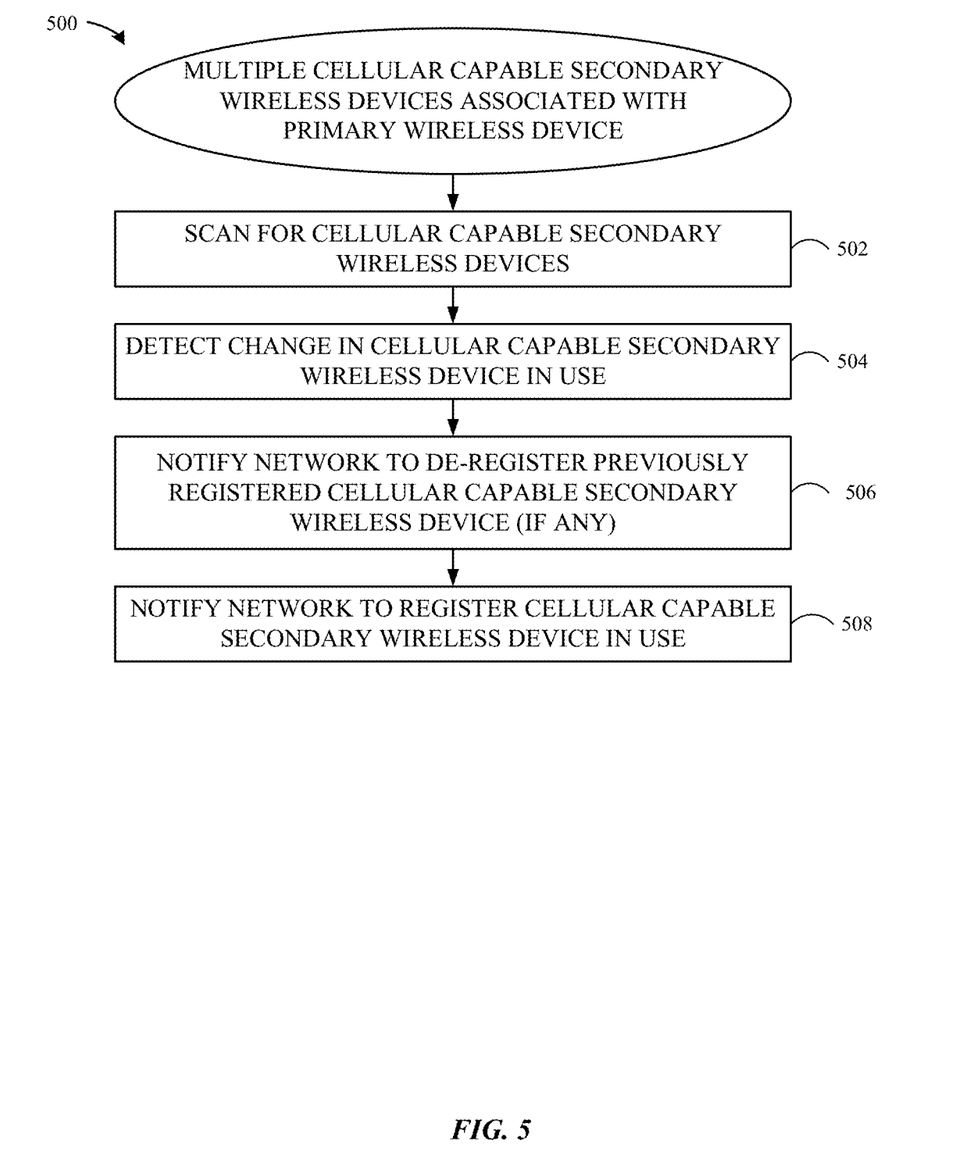
FIG. 5 illustrates a flowchart of an exemplary method for managing registration and deregistration of multiple cellular capable secondary wireless devices associated with a primary wireless device for cellular services according to various embodiments of the present disclosure.

FIG. 5 illustrates a flowchart 500 of an exemplary method performed by a wireless connection manager for managing cellular capable secondary wireless device 320 to access cellular wireless network services, including in some embodiments registration and de-registration processes. The method illustrated in FIG. 5 can be used when one or more (including multiple) cellular capable secondary wireless devices 320 are associated with the primary wireless device 210, or when more than a pre-determined maximum number (set by a wireless network service provider) of cellular capable secondary wireless devices 320 are associated with the primary wireless device 210, or when the wireless service provider restricts the number of cellular capable secondary wireless devices 320 that are associated with the primary wireless device 210 to establish cellular connections at any one time. At 502, the primary wireless device 210 scans for cellular capable secondary wireless devices 320. In some embodiments, the primary wireless device 210 scans for a set of cellular capable secondary wireless devices 320 that have previously associated with (e.g., by a user-initiated pairing process) the primary wireless device 210. In some embodiments, the primary wireless device 210 triggers scanning when a non-cellular wireless connection between the primary wireless device 210 and a currently active cellular capable secondary wireless device 320 is disconnected, e.g., when the currently active cellular capable secondary wireless device 320 moves away from proximity of the primary wireless device 210 and/or a non-cellular wireless connection is blocked. In some embodiments, the primary wireless device 210 triggers scanning when connected to a cellular capable secondary wireless device 320 for which an active/in use state (e.g., based on an "on wrist" detection algorithm) has a low confidence level, e.g., an active/in use metric falls below a associated threshold level for whether the cellular capable secondary wireless device 320 is active or in use. In some embodiments, the primary wireless device 210 triggers scanning based on expiration of a timer or in response to a user input via an input/output interface of the primary wireless device 210.

In some embodiments, the primary wireless device 210 receives messages, e.g., WPAN or Bluetooth advertisement messages, communicated by one or more cellular capable secondary wireless devices 320 during the scanning process or responsive to the scanning process. In some embodiments, the messages received by the primary wireless device 210 include an indication of a status or state for the cellular capable secondary wireless device 320. In some embodiments, the status or state includes information about whether the cellular capable secondary wireless device 320 is in use or active. In some embodiments, the status or state includes a confidence level or metric associated with the active or in use state of the cellular capable secondary wireless device 320. In some embodiments, the confidence level includes a very low confidence level, e.g., when the cellular capable secondary wireless device 320 is determined to be not in use or active, such as when the cellular capable secondary wireless device 320 is connected to a magnetically coupled external charger. In some embodiments, the confidence level includes a low confidence level, e.g., when the cellular capable secondary wireless device 320 is not determined to be "on wrist" or in physical contact with a user but a motion event, such as a wrist raise event, is detected within a recent time period. In some embodiments, the confidence level includes a medium confidence level, e.g., when the cellular capable secondary wireless device 320 detects an "on wrist" condition. In some embodiments, the confidence level includes a high confidence level, e.g., when the cellular capable secondary wireless device 320 detects an "on wrist" condition and also detects a motion event, such as a wrist raise event, within a recent time period while the "on wrist" condition is detected. In some embodiments, the primary wireless device 210 uses information from the received messages to determine whether one or more of the cellular capable secondary wireless devices 320 is active or in use.

At 504, the primary wireless device 210 detects a change in which cellular capable secondary wireless device 320 of a set of cellular capable secondary wireless devices 320 is active or in use. For example, a user can remove a wearable cellular capable secondary wireless device 320 and subsequently put on another wearable cellular capable secondary wireless device 320. The primary wireless device 210 can receive messages from one or more of a set of cellular capable secondary wireless devices 320, e.g., from the previously active cellular capable secondary wireless device 320 and/or the currently active cellular capable secondary wireless device 320, each of which can indicate their own active or in use status. The primary wireless device 210 can determine based on the messages received from the one or more of the set of cellular capable secondary wireless devices 320, which cellular capable secondary wireless device 320 (if any) is active or in use, or more generally a status or state of activity or use for the one or more of the set of cellular capable secondary wireless devices 320. In some embodiments, the primary wireless device 210 determines a status or state of activity or use for each of a set (or a subset of the set) of cellular capable secondary wireless devices 320 that are associated (e.g., previously paired with) the primary wireless device 210. At 506, the primary wireless device 210 notifies a wireless network, e.g., by communicating with a network server, to cause the wireless network to de-register previously registered cellular capable secondary wireless devices 320 (if any) that are no longer active. In some embodiments, the primary wireless device 210 indicates a currently active cellular capable secondary wireless device 320 to the network server of the wireless network, and the network server de-registers any previously active cellular capable secondary wireless devices 320 (other than the currently active cellular capable secondary wireless device 320. In some embodiments, the primary wireless device 210 communicates with the network server to request that one or more previously registered cellular capable secondary wireless devices be de-registered. At 508, the primary wireless device 210 notifies the wireless network, e.g., by communicating with the network server, to cause the wireless network to register the currently active cellular capable secondary wireless device 320. In some embodiments, the primary wireless device 210 indicates to the network server which cellular capable secondary wireless device 320 is active or in use (or an active or in use state for each of one or more cellular capable secondary wireless devices 320) by sending a message that includes a unique identifier for the cellular capable secondary wireless devices 320, e.g., an embedded Universal Integrated Circuit Card (eUICC) identifier (eID), an International Mobile Equipment Identity (IMEI), an International Mobile Subscriber Identity (IMSI), a Mobile Equipment Identity (MEID), a Temporary Mobile Subscriber Identity (TMSI), or the like. The network server can change cellular wireless connectivity status for the cellular capable secondary wireless devices 320 associated with the primary wireless device 210 by performing one or more actions. The actions may include (i) de-registering or detaching any non-active cellular capable secondary wireless devices 320 associated with the primary wireless device 210, (ii) suspending an electronic SIM (eSIM) of non-active cellular capable secondary wireless devices 320 associated with the primary wireless device 210, and/or (iii) deactivating (e.g., suspending a context for) the eSIM of non-active cellular capable secondary wireless devices 320 associated with the primary wireless device 210. The actions may also include (iv) registering any active cellular capable secondary wireless devices 320 associated with the primary wireless device 210, and/or (vi) activating (e.g., resuming a context for) the eSIM of active cellular capable secondary wireless devices 320 associated with the primary wireless device 210. In some embodiments, the wireless network limits a maximum number of active cellular capable secondary wireless devices 320 that can be simultaneously active at any one time for the primary wireless device 210. For example, the network server may allow only one active cellular capable secondary wireless device 320 for the primary wireless device 210, and a most recently indicated (by the primary wireless device 210) active cellular capable secondary wireless device 320 can be registered, resumed, activated, or otherwise enabled to establish cellular wireless connections, while other cellular capable secondary wireless devices 320 associated with the primary wireless device 210 can be de-registered, suspended, deactivated, or otherwise disabled from establishing cellular wireless connections.

Figure 6:
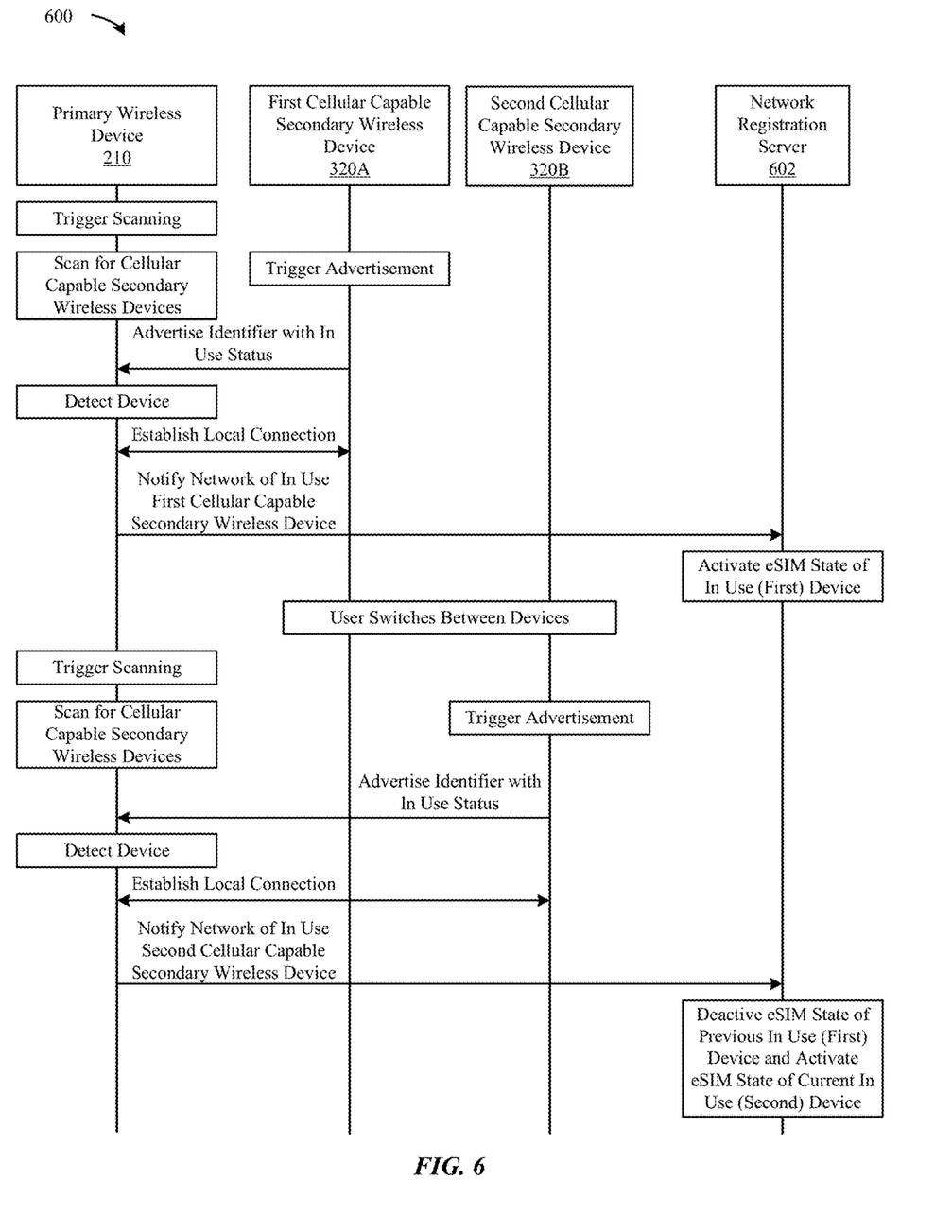
FIG. 6 illustrates a diagram of a message exchange sequence for managing registration and deregistration of multiple cellular capable secondary wireless devices associated with a primary wireless device for cellular services according to various embodiments of the present disclosure.

FIG. 6 illustrates a diagram 600 of a message exchange sequence for managing registration and deregistration of cellular capable secondary wireless devices 320 for cellular wireless services. A primary wireless device 210 can scan for one or more cellular capable secondary wireless devices 320 that may be in proximity to the primary wireless device 210. The primary wireless device 210 may scan for cellular capable secondary wireless devices 320 that have previously associated with (paired with) the primary wireless device 210, e.g., based on actions by a user. Scanning can be triggered based on expiration of a timer, or when a previously connected cellular capable secondary wireless device 320 disconnects from the primary wireless device 210, or based on a low confidence level (or likelihood metric) for an in use or active state of a cellular capable secondary wireless device 320 that is currently connected to the primary wireless device 210. A first cellular capable secondary wireless device 320A can broadcast advertisement messages that can include a payload that indicates a status (or state) of the first cellular capable secondary wireless device 320A. Cellular capable secondary wireless devices 320 can broadcast advertisement messages when not connected to the primary wireless device 210. The advertisement messages, in some embodiments, can include an indication of on "in use" state, such as whether the cellular capable secondary wireless device 320 is "on wrist" or "off wrist" and/or whether a particular motion event, such as a wrist raise event, has occurred in a recent time period. In some embodiments, the advertisement messages include a confidence level state as described herein that can indicate with varying levels of likelihood of whether the cellular capable secondary wireless device 320 is in use. In FIG. 6, the first cellular capable secondary wireless device 320A can be associated with the primary wireless device 210 but not connected to the primary wireless device 210 and can broadcast advertisement messages. The primary wireless device 210 can receive an advertisement message (which can also be referred to as an advertisement identifier) that includes an in use status of the first cellular capable secondary wireless device 320A. Responsive to detection of the first cellular capable secondary wireless device 320A being in use, such as indicated by the in use status included in the advertisement message, the primary wireless device 210 can establish a local connection to the first cellular capable secondary wireless device 320A and notify a network registration server 602 of a wireless network that the first cellular capable secondary wireless device 320A is active or in use. The network registration server 602, responsive to the indication from the primary wireless device 210, can change wireless connection capabilities for the first cellular capable secondary wireless device 320A, such as be registering, resuming, activating, or otherwise enabling credentials (such as included as part of an eSIM) for the first cellular capable secondary wireless device 320A to allow establishment of direct cellular wireless connections to the first cellular capable secondary wireless device 320A.

When a user switches between different cellular capable secondary wireless devices 320, such as from the first cellular capable secondary wireless device 320A to the second cellular capable secondary wireless device 320B, the primary wireless device 210 can trigger scanning (based on a loss of connection to the first cellular capable secondary wireless device 320A and/or based on receipt of a change of in use status from the first cellular capable secondary wireless device 320A) for cellular capable secondary wireless devices 320. The second cellular capable secondary wireless device 320B can be associated with the primary wireless device 210 but not connected to the primary wireless device 210 and can broadcast advertisement messages that includes an in use status for the second cellular capable secondary wireless device 320B. The primary wireless device 210 can establish a connection to the second cellular capable secondary wireless device 320B and can notify the network registration server 602 of the change in which cellular capable secondary wireless device 320 is now active, e.g., by indicating that the second cellular capable secondary wireless device 320B is active and/or that the first cellular capable secondary wireless device 320A is not active. The network registration server 602 can disable wireless cellular connection capability for the first cellular capable secondary wireless device 320A and enable wireless cellular connection capability for the second cellular capable secondary wireless device 320B, such as be changing a registration, activation, context for eSIMs of the first and second cellular capable secondary wireless devices 320A/B.

In some embodiments, the primary wireless device 210 can notify one or more cellular capable secondary wireless devices 320 associated with the primary wireless device 210 whether to disallow or to allow use of cellular wireless connections by the cellular capable secondary wireless devices 320. In some embodiments, notification from the primary wireless device 210 can be communicated to the one or more cellular capable secondary wireless devices 320 via a network-based service for which the primary wireless device 210 and the one or more secondary wireless devices 320 share a common user account, such as via messaging through an iCloud® network service. In some embodiments, notification from the primary wireless device 210 to the one or more cellular capable secondary wireless devices 320 indicates a recommendation about whether to use cellular wireless services. Notification can be provided to cellular capable secondary wireless devices 320 via the network-based service independent of whether the cellular capable secondary wireless devices 320 have enabled wireless circuitry and/or are registered for cellular wireless services. In some embodiments, in response to receipt of a notification from the network-based service to not use cellular wireless services, a cellular capable secondary wireless device 320 can refrain from registering for cellular wireless services or otherwise cause disabling cellular wireless services for the cellular capable secondary wireless device 320, which can include disconnecting active cellular wireless connections (possibly after waiting for completion of any ongoing tasks that use the active cellular wireless connections), deregistering from cellular wireless services when actively registered for such services, and/or placing cellular wireless circuitry in a power-reduced state. In some embodiments, in response to receipt of a notification from the network-based service that indicates allowance to use cellular wireless services, a cellular capable secondary wireless device 320 can cause registration for or otherwise enabling cellular wireless services for the cellular capable secondary wireless device 320, which can include allowing cellular wireless connections to be established, registering for cellular wireless services when not actively registered for such services, and/or placing cellular wireless circuitry in a non-power-reduced state.

Figure 7:
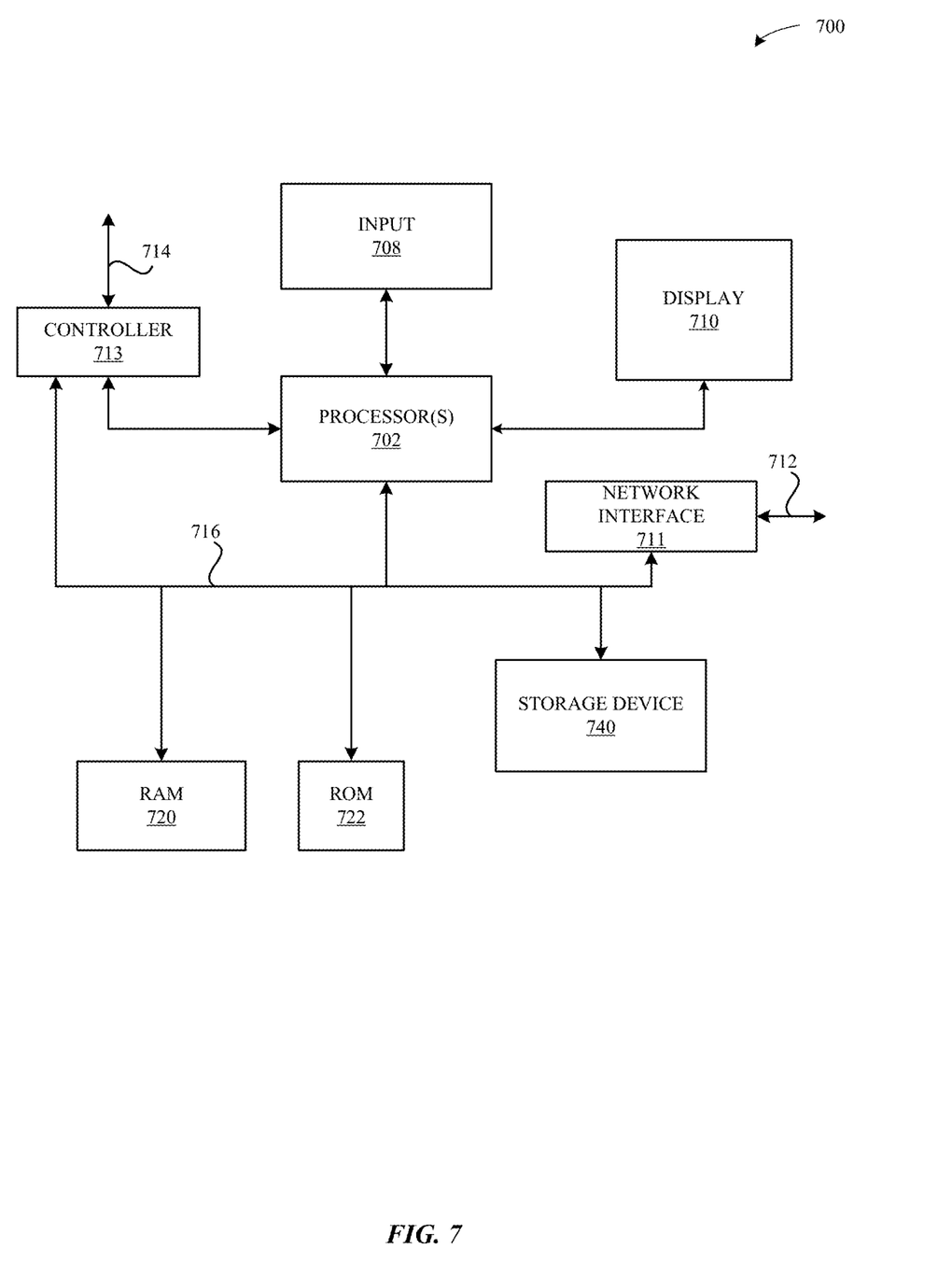
FIG. 7 illustrates in block diagram format an exemplary computing device that can be used to implement the various components and techniques described herein according to various embodiments of the present disclosure.

FIG. 7 illustrates in block diagram format an exemplary computing device 700 that can be used to implement the various components and techniques described herein, according to some embodiments. In particular, the detailed view of the exemplary computing device 700 illustrates various components that can be included in the wireless device 102 illustrated in FIG. 1. As shown in FIG. 7, the computing device 700 can include one or more processors 702 that can represent microprocessors or controllers for controlling the overall operation of computing device 700. The computing device 700 can also include a user input device 708 that allows a user of the computing device 700 to interact with the computing device 700. For example, the user input device 708 can take a variety of forms, such as a button, keypad, dial, touch screen, audio input interface, visual/image capture input interface, input in the form of sensor data, etc. Still further, the computing device 700 can include a display 710 (screen display) that can be controlled by the processor(s) 702 to display information to the user (for example, information relating to incoming, outgoing, or active communication session). A data bus 716 can facilitate data transfer between at least a storage device 740, the processor(s) 702, and a controller 713. The controller 713 can be used to interface with and control different equipment through an equipment control bus 714. The computing device 700 can also include a network/bus interface 711 that couples to a data link 712. In the case of a wireless connection, the network/bus interface 711 can include wireless circuitry, such as wireless transceivers and/or baseband processors.

The computing device 700 also includes a storage device 740, which can comprise a single storage or a plurality of storages (e.g., hard drives), and includes a storage management module that manages one or more partitions within the storage device 740. In some embodiments, storage device 740 can include flash memory, semiconductor (solid state) memory or the like. The computing device 700 can also include a Random Access Memory ("RAM") 720 and a Read-Only Memory ("ROM") 722. The ROM 722 can store programs, utilities or processes to be executed in a non-volatile manner. The RAM 720 can provide volatile data storage, and stores instructions related to the operation of the computing device 700.

Figure 8:
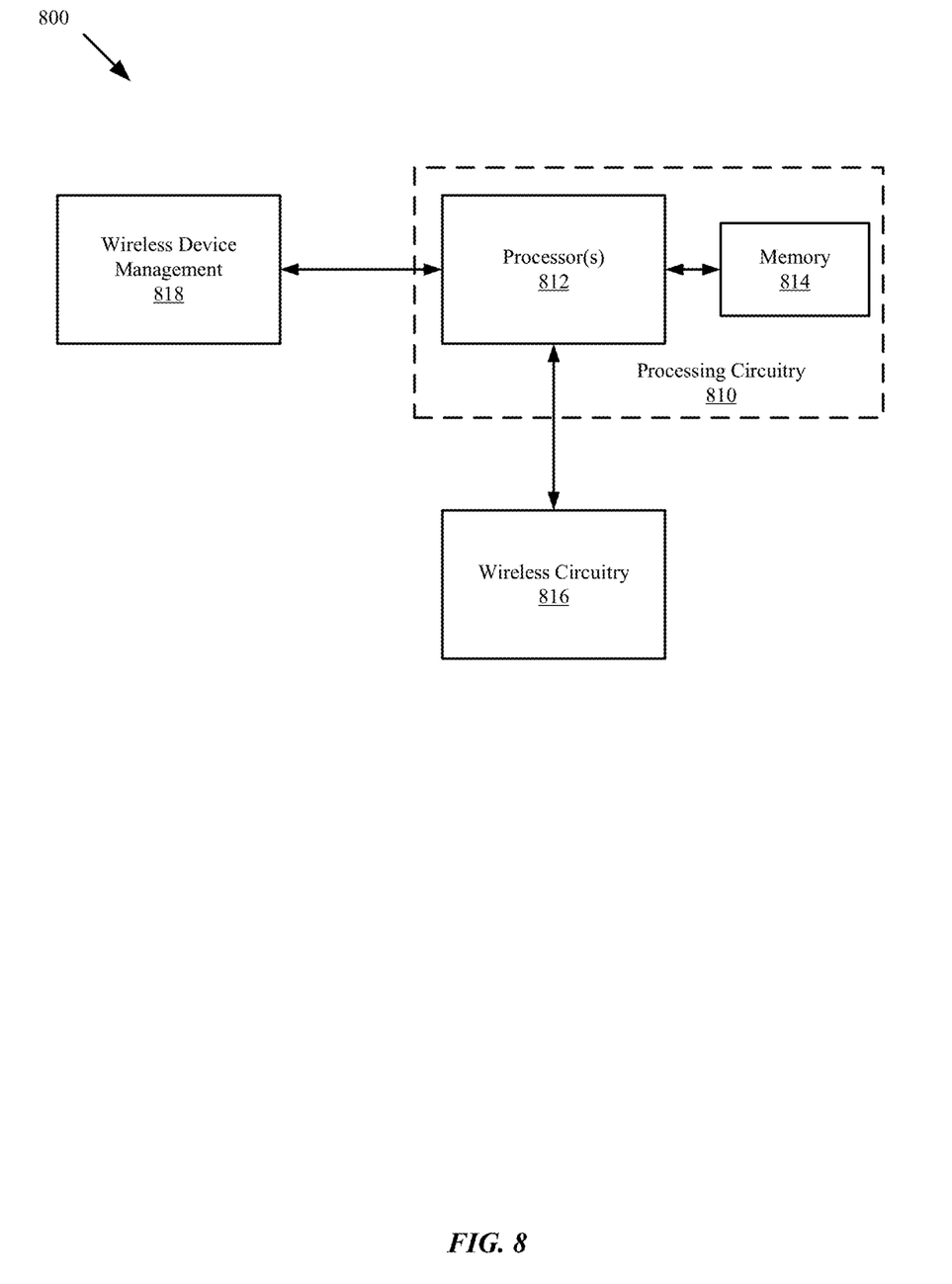
FIG. 8 illustrates in block diagram format an example representative set of elements of a wireless device that can be used to implement the various components and techniques described herein according to various embodiments of the present disclosure.

FIG. 8 illustrates a block diagram of an example apparatus 800 that can be implemented in a wireless device 102, e.g., a primary wireless device 210 and/or a cellular capable secondary wireless device 320 and/or to realize, at least in part, management of registration or control of credentials, such as of eSIMs, for cellular services for cellular capable secondary wireless devices 320 associated with the primary wireless device 210, in accordance with some embodiments. It will be appreciated that the components, devices or elements illustrated in and described with respect to FIG. 8 may not be mandatory and thus some may be omitted in certain embodiments. Additionally, some embodiments can include further or different components, devices or elements beyond those illustrated in and described with respect to FIG. 8. Further, it will be appreciated that, in some embodiments, one or more components of the apparatus 800 can be distributed across a plurality of computing devices that can collectively provide the functionality for wireless connection management.

In some example embodiments, the apparatus 800 can include processing circuitry 810 that is configurable to perform actions in accordance with one or more example embodiments disclosed herein. In this regard, the processing circuitry 810 can be configured to perform and/or control performance of one or more functionalities of the apparatus 800 in accordance with various embodiments, and thus can provide means for performing functionalities of the apparatus 800 in accordance with various embodiments. The processing circuitry 810 can be configured to perform data processing, application execution and/or other processing and management services according to one or more embodiments.

In some embodiments, the apparatus 800 or a portion(s) or component(s) thereof, such as the processing circuitry 810, can include one or more chipsets, each of which can include one or more chips. The processing circuitry 810 and/or one or more further components of the apparatus 800 can therefore, in some instances, be configured to implement an embodiment on a chipset comprising one or more chips. In some example embodiments in which one or more components of the apparatus 800 are embodied as a chipset, the chipset can be capable of enabling a computing device(s) to operate wireless device in accordance with embodiments as disclosed herein.

In some example embodiments, the processing circuitry 810 can include a processor 812 and, in some embodiments, such as that illustrated in FIG. 8, can further include memory 814 (or another non-transitory storage medium). The processing circuitry 810 can be in communication with or otherwise control wireless circuitry 816 and/or a wireless device management module 818.

The processor 812 can be embodied in a variety of forms. For example, the processor 812 can be embodied as various processing hardware-based means such as a microprocessor, a coprocessor, a controller or various other computing or processing devices including integrated circuits such as, for example, an ASIC (application specific integrated circuit), an FPGA (field programmable gate array), some combination thereof, or the like. Although illustrated as a single processor, it will be appreciated that the processor 812 can include a plurality of processors. The plurality of processors can be in operative communication with each other and can be collectively configured to perform one or more functionalities of the apparatus 800 as described herein. In embodiments including a plurality of processors, the plurality of processors can be implemented on a single computing device, or can be distributed across a plurality of computing devices that can collectively provide functionality of a wireless device, such as the primary wireless device 210 and/or cellular capable secondary wireless devices 320. In some example embodiments, the processor 812 can be configured to execute instructions that can be stored in the memory 814 or that can be otherwise accessible to the processor 812. As such, whether configured by hardware or by a combination of hardware and software, the processor 812 can be capable of performing operations according to various embodiments while configured accordingly.

In some embodiments, the memory 814 can include one or more memory devices. The memory 814 can include fixed and/or removable memory devices. In some embodiments, the memory 814 can provide a non-transitory computer-readable storage medium that can store computer program instructions that can be executed by the processor 812. In this regard, the memory 814 can be configured to store information, data, applications, instructions and/or the like for enabling the apparatus 800 to carry out various functions in accordance with one or more embodiments. In embodiments including a plurality of memory devices, the plurality of memory devices can be implemented on a single computing device, or can be distributed across a plurality of computing devices that can collectively provide functionality of a wireless device. In some embodiments, the memory 814 can be in communication with one or more of the processor 812, wireless circuitry 816, or wireless device management module 818 via one or more busses for passing information among components of the apparatus 800.

The apparatus 800 can further include wireless circuitry 816. The wireless circuitry 816 can include one or more interface mechanisms for enabling communication with other devices and/or networks. For example, the wireless circuitry 816 can be configured to enable the apparatus 800 to communicate over one or more networks, such as the WWAN 108, the WLAN 106, and/or the WPAN 104. The apparatus 800 can include multiple sets of wireless circuitry 816, which can each provide communication in accordance with a wireless communication protocol. In various embodiments, the wireless circuitry 816 can include, for example, an antenna (or multiple antennas) and supporting hardware and/or software for enabling communications with one or more wireless communication networks, such as a cellular network. In some embodiments, the wireless circuitry 816 can be referred to as a communication interface(s) and include a combination of requisite hardware, software, or firmware to provide wireless communications in accordance with one or more wireless communication protocols, such as a Wi-Fi protocol, an IEEE 802.11 wireless communication protocol, a cellular wireless communication protocol, a WLAN protocol, a WPAN protocol, e.g., such as Bluetooth or Apple Wireless Direct Link (AWDL).

The apparatus 800 can further include a wireless device management module 818. The wireless device management module 818 can be embodied as various means, such as circuitry, hardware, a computer program product comprising computer readable program instructions stored on a non-transitory computer readable medium (for example, the memory 814) and executed by a processing device (for example, the processor 812), or some combination thereof. In some embodiments, the processor 812 (or the processing circuitry 810) can include, or otherwise control the wireless device management module 818. The wireless device management module 818 can be configured to support management of registration of (or control access to cellular wireless services for) cellular capable secondary wireless devices 320 associated with the primary wireless device 210 in support of one or more example embodiments.

The various aspects, embodiments, implementations or features of the described embodiments can be used separately or in any combination. Various aspects of the described embodiments can be implemented by software, by hardware, or by a combination of hardware and software. The described embodiments can also be embodied as computer readable code on a computer readable medium. The computer readable medium is any data storage device that can store data, which can thereafter be read by a computer system. Examples of the computer readable medium include read-only memory, random-access memory, CD-ROMs, DVDs, magnetic tape, hard storage drives, solid state drives, and optical data storage devices. The computer readable medium can also be distributed over network-coupled computer systems so that the computer readable code is stored and executed in a distributed fashion.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of specific embodiments are presented for purposes of illustration and description. They are not intended to be exhaustive or to limit the described embodiments to the precise forms disclosed. It will be apparent to one of ordinary skill in the art that many modifications and variations are possible in view of the above teachings.

What is claimed is:

1. A method for managing access to cellular services for cellular capable secondary wireless devices associated with a primary wireless device, the method comprising:
by the primary wireless device:
scanning for associated cellular capable secondary wireless devices; and
in response to detecting a change of status of an associated cellular capable secondary wireless device to an in use state, notifying a network server of a cellular wireless network to cause the network server to:
disable access to cellular wireless services for one of a set of previously registered cellular capable secondary wireless devices associated with the primary wireless device, when a pre-defined maximum number of previously registered cellular capable secondary wireless devices associated with the primary wireless device have enabled access to cellular wireless services; and
enable access to cellular wireless services for the associated cellular capable secondary wireless device that is in use.

2. The method of claim 1, wherein the network server disables access to cellular wireless services for the one of the set of previously registered cellular capable secondary wireless devices by at least deregistering the one of the set of previously registered cellular capable secondary wireless devices.

3. The method of claim 2, wherein the network server disables access to cellular wireless services for the one of the set of previously registered cellular capable secondary wireless devices further by at least detaching the one of the set of previously registered cellular capable secondary wireless devices from the cellular wireless network.

4. The method of claim 2, wherein the network server enables access to cellular wireless services for the associated cellular capable secondary wireless device that is in use by at least registering the associated cellular capable secondary wireless device that is in use.

5. The method of claim 1, wherein the network server disables access to cellular wireless services for the one of the set of previously registered cellular capable secondary wireless devices by at least suspending an electronic Subscriber Identity Module (eSIM) state of the one of the set of previously registered cellular capable secondary wireless devices.

6. The method of claim 5, wherein the network server enables access to cellular wireless services for the associated cellular capable secondary wireless device that is in use by at least resuming or reinstating the eSIM state of the associated cellular capable secondary wireless device that is in use.

7. The method of claim 1, wherein the network server disables access to cellular wireless services for the one of the set of previously registered cellular capable secondary wireless devices by at least deactivating or removing a context for an electronic Subscriber Identity Module (eSIM) state of the one of the set of previously registered cellular capable secondary wireless devices.

8. The method of claim 7, wherein the network server enables access to cellular services for the associated cellular capable secondary wireless device that is in use by at least activating or restoring a context for the eSIM state of the associated cellular capable secondary wireless device that is in use.

9. The method of claim 1, wherein the primary wireless device notifies the network server by at least providing to the network server a unique device identifier for the associated cellular capable secondary wireless device that is in use.

10. The method of claim 9, wherein the unique device identifier comprises one or more of: an embedded Universal Integrated Circuit Card (eUICC) identifier (eID), an International Mobile Equipment Identity (IMEI), an International Mobile Subscriber Identity (IMSI), a Mobile Equipment Identity (MEID), or a Temporary Mobile Subscriber Identity (TMSI).

11. The method of claim 1, wherein the primary wireless device detects the change of status of the associated cellular capable secondary wireless device to the in use state based at least in part on receipt of an advertisement message from the associated cellular capable secondary wireless device that is in use, the advertisement message including a payload indicating the in use state.

12. The method of claim 11, wherein the in use state comprises one of: an on wrist state or an off wrist state.

13. The method of claim 11, wherein the in use state comprises an indication of whether a particular motion event occurred within a recent time period.

14. The method of claim 11, wherein the payload further includes a confidence level for the in use state.

15. The method of claim 14, wherein the primary wireless device scans for associated cellular capable secondary wireless devices based at least in part on the confidence level for the in use state.

16. The method of claim 1, wherein the primary wireless device scans for associated cellular capable secondary wireless devices in response to expiration of a timer.

17. The method of claim 1, wherein the primary wireless device scans for associated cellular capable secondary wireless devices in response to detecting disconnection of a previously connected, associated cellular capable secondary wireless device.

18. A primary wireless device comprising:
at least one antenna;
wireless circuitry communicatively coupled to the at least one antenna; and
at least one processor and memory storing instructions that, when executed by the at least one processor, cause the primary wireless device to:
scan for cellular capable secondary wireless devices associated with the primary wireless device; and
in response to detecting a change of status of an associated cellular capable secondary wireless device to an in use state, notify a network server of a cellular wireless network to cause the network server to:
disable access to cellular wireless services for one of a set of previously registered cellular capable secondary wireless devices associated with the primary wireless device, when a pre-defined maximum number of previously registered cellular capable secondary wireless devices associated with the primary wireless device have enabled access to cellular wireless services; and
enable access to cellular wireless services for the associated cellular capable secondary wireless device that is in use.

19. The primary wireless device of claim 18, wherein the primary wireless device detects the change of status of the associated cellular capable secondary wireless device to the in use state based at least in part on receipt of an advertisement message from the associated cellular capable secondary wireless device that is in use, the advertisement message including a payload indicating the in use state.

20. An apparatus configurable for operation in a primary wireless device, the apparatus comprising at least one processor and memory storing instructions that, when executed by the at least one processor, cause the primary wireless device to:
scan for cellular capable secondary wireless devices associated with the primary wireless device; and
in response to detecting a change of status of an associated cellular capable secondary wireless device to an in use state, notify a network server of a cellular wireless network to cause the network server to:
disable access to cellular wireless services for one of a set of previously registered cellular capable secondary wireless devices associated with the primary wireless device, when a pre-defined maximum number of previously registered cellular capable secondary wireless devices associated with the primary wireless device have enabled access to cellular wireless services; and
enable access to cellular wireless services for the associated cellular capable secondary wireless device that is in use.

* * * * *